(12) United States Patent
Faibish et al.

(10) Patent No.: US 10,382,407 B1
(45) Date of Patent: Aug. 13, 2019

(54) ENCRYPTION AND DECRYPTION OF TIME SERIES DATA USING A DIGITAL FILTER ARRAY

(71) Applicant: EMC IP Holding Company LLC, Hopkinton, MA (US)

(72) Inventors: Sorin Faibish, Newton, MA (US); Dennis P. J. Ting, Groton, MA (US); James M. Pedone, Jr., West Boylston, MA (US); Percy Tzelnic, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 15/476,036

(22) Filed: Mar. 31, 2017

(51) Int. Cl.
*H04L 29/00* (2006.01)
*H04L 29/06* (2006.01)
*H03H 17/06* (2006.01)
*G06F 7/58* (2006.01)

(52) U.S. Cl.
CPC ......... *H04L 63/0435* (2013.01); *H03H 17/06* (2013.01); *G06F 7/582* (2013.01)

(58) Field of Classification Search
CPC ...... H04L 63/0435; H03H 17/06; G06F 7/582
See application file for complete search history.

(56) References Cited

U.S. PATENT DOCUMENTS

| | | | | |
|---|---|---|---|---|
| 4,667,298 A * | 5/1987 | Wedel, Jr. | ................ | G06J 1/00 708/3 |
| 5,101,432 A | 3/1992 | Webb | | |
| 6,487,524 B1 * | 11/2002 | Preuss | ................ | G05B 15/02 700/280 |
| 6,636,747 B2 * | 10/2003 | Harada | ................ | H04W 88/06 455/419 |
| 7,426,245 B2 * | 9/2008 | Husth | ................ | H04L 25/062 375/319 |
| 7,672,453 B1 * | 3/2010 | Matolak | ................ | H04K 1/04 380/263 |

(Continued)

OTHER PUBLICATIONS

Faibish et al., "A New Closed-Loop Non-Linear Filter Design", European Control Conference, Grenoble, France, Jul. 2-5, 1991.

(Continued)

*Primary Examiner* — Don G Zhao
(74) *Attorney, Agent, or Firm* — Ryan, Mason & Lewis, LLP

(57) ABSTRACT

Techniques are provided for encryption and decryption of time series data using a digital filter array. A plurality of digital time series samples generated by a digital time series generation device are applied to a digital filter array (e.g., a finite impulse response filter or an infinite impulse response filter) that combines delayed versions of the digital time series samples using a plurality of coefficients to generate a plurality of encrypted digital time series samples. The plurality of coefficients comprise a portion of an encryption key associated with the digital time series generation device. The digital time series generation device has an associated device identifier, and the device identifier and the corresponding encryption key are registered with a server. The plurality of encrypted digital time series samples and the device identifier are provided to the server for decryption using an inverse digital filter array based on the encryption key.

20 Claims, 6 Drawing Sheets

(56) References Cited

U.S. PATENT DOCUMENTS

| | | | |
|---|---|---|---|
| 9,234,977 B2* | 1/2016 | Ferber | G01V 1/364 |
| 2004/0083258 A1* | 4/2004 | Haneda | G06Q 30/06 |
| | | | 709/201 |
| 2005/0013359 A1* | 1/2005 | Srinivasan | G10L 19/0212 |
| | | | 375/240.03 |
| 2008/0172434 A1* | 7/2008 | Henry | H04N 19/147 |
| | | | 708/308 |
| 2010/0198142 A1* | 8/2010 | Sloan | A61B 5/14532 |
| | | | 604/66 |
| 2010/0204557 A1* | 8/2010 | Kiaie | A61B 5/14532 |
| | | | 600/365 |
| 2014/0032506 A1* | 1/2014 | Hoey | G06F 17/30303 |
| | | | 707/691 |
| 2014/0122885 A1* | 5/2014 | Wu | H04L 29/06 |
| | | | 713/171 |
| 2014/0186048 A1* | 7/2014 | Oshima | H04B 10/541 |
| | | | 398/118 |
| 2014/0232903 A1* | 8/2014 | Oshima | H04N 5/3532 |
| | | | 348/229.1 |
| 2015/0229329 A1* | 8/2015 | Yamada | H03M 7/6023 |
| | | | 714/759 |
| 2015/0295949 A1* | 10/2015 | Chizeck | H04L 12/12 |
| | | | 726/23 |
| 2015/0366518 A1* | 12/2015 | Sampson | A61B 5/7221 |
| | | | 600/301 |
| 2016/0249820 A1* | 9/2016 | Puig | A61B 5/02416 |
| | | | 600/479 |
| 2016/0380760 A1* | 12/2016 | Campos Canton | H04L 9/001 |
| | | | 380/28 |
| 2018/0113442 A1* | 4/2018 | Nixon | G05B 19/4184 |
| 2018/0189455 A1* | 7/2018 | Hart | G16H 10/60 |
| 2018/0191791 A1* | 7/2018 | Hart | H04L 65/4069 |

OTHER PUBLICATIONS

Candocia et al., "A Time-Domain Approach to Determining Inverse FIR Filters", Proceedings of the 2006 International Conference on Image Processing, Computer Vision & Pattern Recognition, vol. 1, Las Vegas, NV, Jun. 26-29, 2006.

Kyle Olive, "The Raspberry Pi Primer Part 1: Introduction and Required Hardware", posted Sep. 13, 2013; downloaded on Mar. 7, 2017 from https://www.eeweb.com/blog/embedded_developer/the-raspberry-pi-primer-part-1-introduction-and-required-hardware.

"Z-Transform", downloaded from Wikipedia on Mar. 27, 2017 from https://en.wikipedia.org/wiki/Z-transform.

* cited by examiner

ENCRYPTION AND DECRYPTION OF TIME SERIES DATA USING A DIGITAL FILTER ARRAY

FIELD

The field relates generally to information processing systems, and more particularly to the protection of time series data in information processing systems.

BACKGROUND

Large data monitoring systems (for example, in the automotive, manufacturing and air travel industries) generate a large number of metric and log data entries over time. In large scale industrial processes, for example, multiple time series comprising a sequence of data collected over time are often collected by various sensors. In addition, the Internet-of-Things (IoT) is a network of physical objects, such as sensors and other devices, that generate time series data and exchange such time series data, for example, with Internet-of-Things servers for storage and/or analysis. The Internet-of-Things has many applications, including home monitoring and control, automobile maintenance and health monitoring and management.

The Internet-of-Things has contributed to explosive growth in the number of sensor devices, as well as the corresponding amount of time series data generated by such sensor devices in residential and commercial environments. A need exists for improved techniques for encrypting and decrypting such time series data, for example, to ensure the security of potentially private information and to prevent a malicious user from modifying the content of the time series data.

SUMMARY

In one embodiment, a plurality of digital time series samples generated by a digital time series generation device are applied to a digital filter array (e.g., a finite impulse response filter or an infinite impulse response filter) that combines delayed versions of the digital time series samples using a plurality of coefficients to generate a plurality of encrypted digital time series samples. The plurality of coefficients comprise a portion of an encryption key associated with the digital time series generation device. The digital time series generation device has an associated device identifier, and the device identifier and the corresponding encryption key are registered with a server. The plurality of encrypted digital time series samples and the device identifier are provided to the server for decryption using an inverse digital filter array.

In one or more embodiments, the encryption key associated with the digital time series generation device is generated using a pseudo random number generator. In some embodiments, the server generates the inverse digital filter array for the decryption based on the encryption key and optionally detects whether the plurality of digital time series samples comprises one or more of erroneous digital time series samples and falsified digital time series samples.

Other illustrative embodiments include, without limitation, apparatus, systems, methods and computer program products comprising processor-readable storage media.

DETAILED DESCRIPTION

Figure 1:
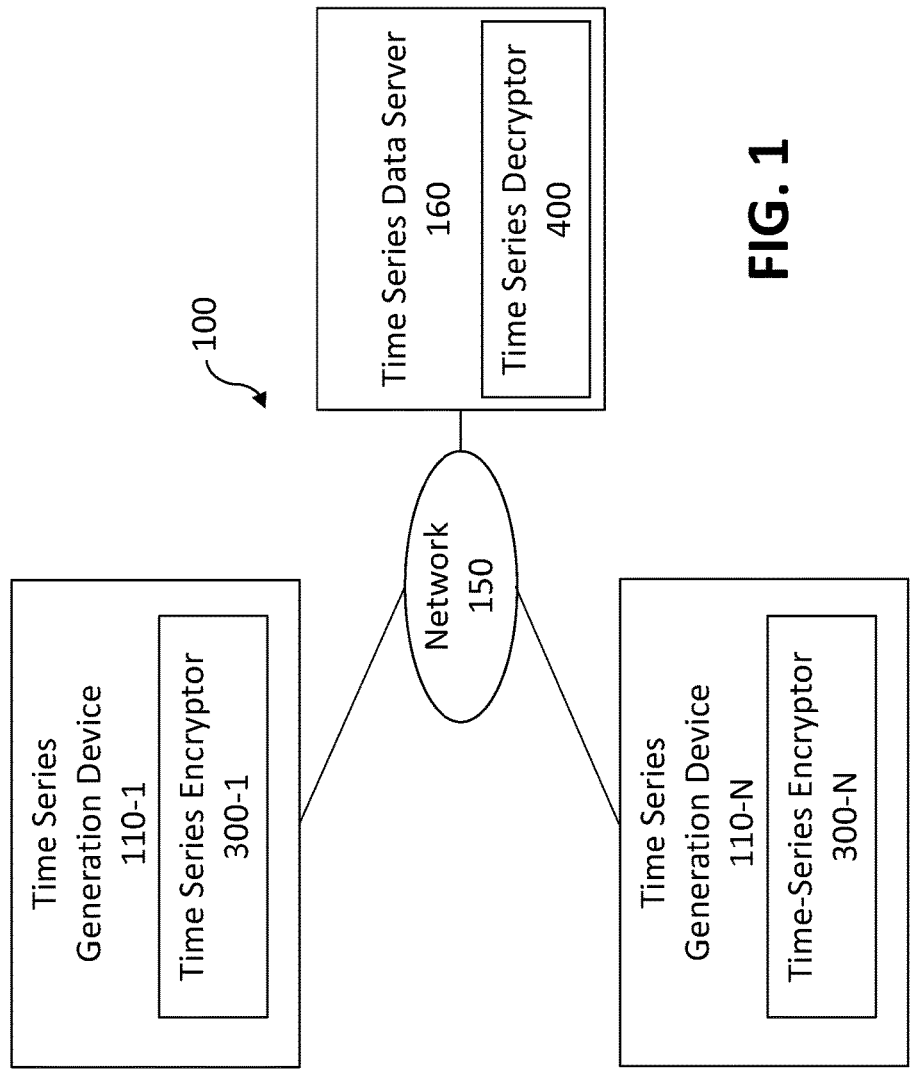
FIG. 1 illustrates an exemplary information processing system, according to one embodiment of the present disclosure.

Illustrative embodiments of the present disclosure will be described herein with reference to exemplary information processing systems and associated computers, servers, storage devices and other processing devices. It is to be appreciated, however, that embodiments of the disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. Numerous other types of personal, enterprise and cloud-based computing and storage systems are also encompassed by the term "information processing system" as that term is broadly used herein.

In one or more illustrative embodiments of the disclosure, time series samples comprising sensor data generated by a time series generation device (such as a sensor device) are encrypted by applying the time series samples to a digital filter array, such as an FIR (Finite Impulse Response) filter or an IIR (Infinite Impulse Response) filter. The digital filter array combines delayed versions of the time series samples using a plurality of coefficients to generate encrypted time series samples. Each coefficient comprises a portion of an encryption key associated with the time series generation device. The time series generation device has an associated device identifier that is provided with the corresponding encryption key to a server, for example, during a registration process. The server decrypts the encrypted time series samples using an inverse digital filter array obtained using the encryption key.

As used herein, a digital filter array combines delayed versions of digital samples using a plurality of coefficients to generate encrypted samples. For example, in one or more embodiments, the digital filter array may comprise an N stage delay line and N+1 filter taps weighted by a corresponding coefficient. Each delay line may be implemented as a $z^{-1}$ operator in the z domain. In at least one embodiment, each encrypted sample is the sum of the outputs from the N+1 weighted filter taps. The digital filter array may be implemented, for example, as an FIR filter or an IIR filter. The digital filter array can be implemented, for example, in the transmission software or circuitry that generates the time series data.

In one or more embodiments of the disclosure, the encryption key associated with each time series generation device is generated using a pseudo random number generator, such as an SHA (Secure Hash Algorithm) 256 cryptographic hash function. In this manner, the encryption keys specific to each device are generated in at least one exemplary embodiment using random white noise (e.g., no frequency information).

In at least one exemplary embodiment, the server decrypts the encrypted time series samples using the corresponding encryption key to remove the added colored noise in an inverse digital filter array that recreates the original time series data. The exemplary server can optionally detect anomalies in the decrypted time series data, such as erroneous and/or falsified time series samples, by evaluating a second derivative continuity as well as sensor specific characteristics.

One or more embodiments of the disclosure recognize that existing Internet-of-Things implementations do not sufficiently protect against malicious access to potentially private information that can be used against the victim. For example, if not properly secured, a home management system can provide hackers with an indication of a time when nobody is at home (e.g., based on security system and/or temperature settings), which can be used by thieves for home invasion. When the time series data is encrypted point-by-point, it is possible for hackers or other malicious users to reverse the encryption using the sequence of signals as well as the type of the source device to decrypt the data.

Using encryption keys to protect time series data, however, can be tedious and require a complex key management schema, both at the time series generation devices (such as sensors), as well as at the server. The servers, for example, collect data from a large number of data sources and need to manage separate keys for each data source. In addition, the time series generation devices often do not have sufficient computing and memory resources to run complex encryption algorithms to protect the time series data.

One or more embodiments generate an encryption key that is unique for each source device. The assigned encryption key can be physically encoded (e.g., hardwired) and/or securely stored in the corresponding source device, along with a device identifier of the corresponding source device. In this manner, the encryption key cannot be obtained from outside the source device and the encryption key is unknown even to the source device generating the time series samples.

The encryption key is applied as an input to the digital filter array, adding colored noise generated by the specific key. The digital filter array can be implemented, for example, in the transmission software or processing circuitry (e.g., a field-programmable gate array (FPGA) or a single board computer, such as a Raspberry Pi computer (Raspberry Pi Foundation)) in the source device that generates the time series data. Substantially similar software or circuitry can be used in the server to implement the inverse digital filter array.

In many embodiments, compute services are provided for users under a platform-as-a-service (PaaS) model, although it is to be appreciated that numerous other cloud infrastructure arrangements could be used.

Advantageously, one or more embodiments provide significantly improved encryption and decryption of time series data. As a result, in certain embodiments, potentially private time series data is protected and a malicious user cannot falsify the data.

The example embodiment of FIG. 1 shows an information processing system 100 configured in accordance with an illustrative embodiment of the present disclosure. As shown in FIG. 1, the exemplary information processing system 100 comprises a plurality of time series generation devices 110-1 through 110-N, such as sensor devices. The time series generation devices 110 are digital devices that each generate digital time series samples over time. The time series generation devices 110 communicate over a network 150 with one or more time series data servers 160. As shown in FIG. 1, each time series generation device 110 comprises a corresponding time series encryptor 300-1 through 300-N, as discussed further below in conjunction with FIG. 3. In addition, each time series data server 160 comprises a corresponding time series decryptor 400, as discussed further below in conjunction with FIG. 4.

The time series generation devices 110 can comprise, for example, sensor devices, or other types of processing devices capable of generating time series data and communicating with the time series data server 160 over the network 150. The network 150 is assumed to comprise a portion of a global computer network such as the Internet, although other types of networks can be part of the network 150, including a wide area network (WAN), a local area network (LAN), a satellite network, a telephone or cable network, a cellular network, a wireless network such as a WiFi or WiMAX network, or various portions or combinations of these and other types of networks. The network 150 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand®, Gigabit Ethernet or Fibre Channel. Numerous alternative networking arrangements are possible in a given embodiment, as will be appreciated by those skilled in the art.

Referring again to FIG. 1, the time series data server 160 in some embodiments may be implemented as part of cloud infrastructure in the form of a cloud-based system such as an Amazon Web Services™ (AWS) system. Other examples of cloud-based systems that can be used to provide at least portions of the time series data server 160 and possibly other portions of system 100 include Google Cloud Platform™ (GCP) and Microsoft Azure®.

The time series data server 160 in the embodiment of FIG. 1 and other processing platforms referred to herein are assumed to be implemented using one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux® containers (LXCs), or combinations of both as in an arrangement in which Docker containers or other types of LXCs are configured to run on VMs.

In the FIG. 1 embodiment, the time series data server 160 is assumed to be implemented utilizing one or more storage systems of their corresponding processing platform(s). Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and associated storage systems that are configured to communicate over one or more networks. For example, distributed implementations of the time series data server 160 are possible, in which certain components of the time series data server 160 reside in one data center in a first geographic location while other components of the time series data server 160 reside in one or more other data centers in one or more other geographic locations that are potentially remote from the first geographic location. Thus, it is possible in some implementations of the system 100 for the time series data server 160 to reside in a different data center than other platform components. Numerous other distributed implementations of the time series data server 160 are possible.

It is to be appreciated that these and other features of illustrative embodiments are presented by way of example only, and should not be construed as limiting in any way. Accordingly, different numbers, types and arrangements of system components such as time series generation devices 110 and time series data server 160 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to FIGS. 2 through 4.

Figure 2:
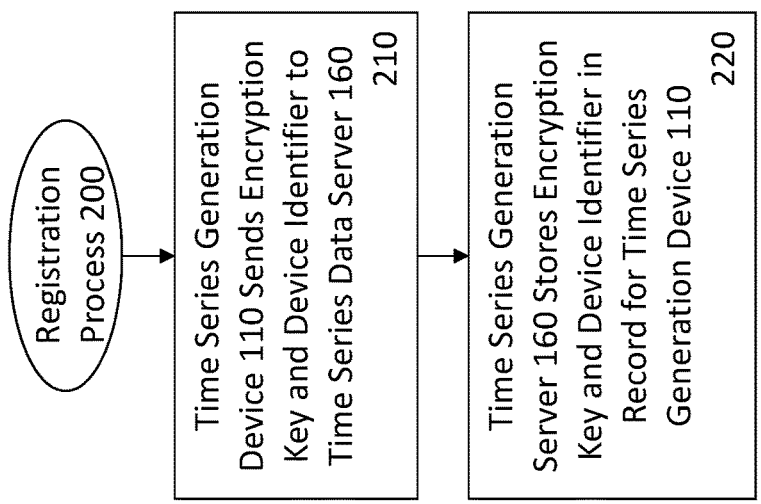
FIG. 2 is a flow chart illustrating an exemplary implementation of a source device registration process, according to one embodiment of the disclosure.

FIG. 2 is a flow chart illustrating an exemplary implementation of a source device registration process 200 according to one embodiment of the disclosure. Generally, the source device registration process 200 can be implemented, for example, when a given time series generation device 110 (e.g., the source device) is reset or powered on. As noted above, each time series generation device 110 has a unique encryption key in one or more embodiments of the disclosure. The generated encryption key can be physically encoded (e.g., hardwired) and/or securely stored in the corresponding time series generation device 110, along with the device identifier (MD) of the device 110.

As shown in FIG. 2, when the exemplary registration process 200 for a given time series generation device 110 is executed, the time series generation device 110 sends the encryption key and corresponding device identifier of the time series generation device 110 to the time series server 160 during step 210. The time series generation server 160 then stores the received encryption key and device identifier in a record during step 220 for the time series generation device 110.

The device identifier can be used by the time series server 160 to lookup a corresponding device type, or the time series generation device 110 can send the device type to the time series server 160 during step 210 as well.

In one or more embodiments, the encryption key of a given device 110 can be used as a color noise generator that protects the time series data. The time series data server 160 can reconstruct the original time series signal using an inverse FIR filter colored by the encryption key of the given device 110.

In at least one embodiment, the exemplary registration process 200 is performed by a third party, for example, using a web browser and not by a given time series generation device 110. In this manner, the encryption key is not sent to the time series server 160 in the clear (i.e., unencrypted) between the given time series generation device 110 and the time series server 160. For example, a user of a given time series generation device 110 can access the time series server 160 over the Internet and provide the encryption key directly to the cloud. There is no direct connection between the given time series generation device 110 and the cloud at that time. In fact, the registration can optionally be done by the appliance vendor directly to the cloud on request from the owner of the IoT appliance.

In one or more exemplary implementations, the appliance does not even need to be online or powered on at registration time. Thus, there is no way for a hacker to associate the encryption key with any transmission of time series data except for the OID, which is essentially useless.

Figure 3:
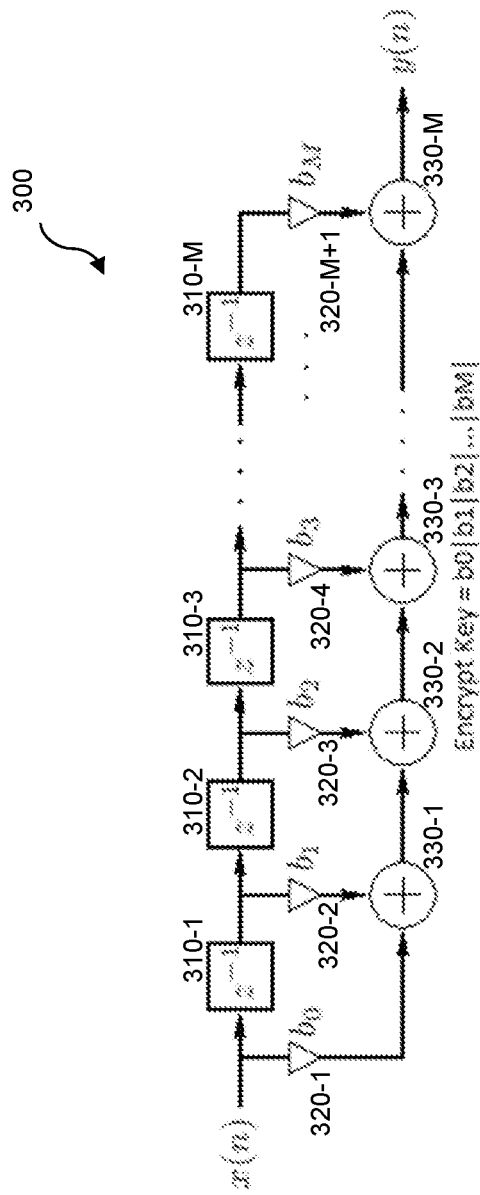
FIG. 3 illustrates an exemplary implementation of the time series encryptor of FIG. 1, according to one embodiment of the disclosure.

FIG. 3 illustrates an exemplary implementation of the time series encryptor 300 of FIG. 1, according to one embodiment of the disclosure. As previously indicated, in one or more embodiments, a digital filter array is used to encrypt time series data. The digital filter array combines delayed versions of the digital time series samples using a plurality of coefficients to generate encrypted samples. As shown in FIG. 3, the exemplary time series encryptor 300 comprises an M stage delay line comprised of delay elements (e.g., $z^{-1}$ operator in the z domain) 310-1 through 310-M, and M+1 filter taps 320-1 through 320-M weighted by a corresponding coefficient, $b_i$, based on the encryption key. The encryption key of the source device 110 is equal to $b_0|b_1|b_2| \ldots |b_M|$. Each encrypted sample is the sum of the M+1 weighted filter taps using adders 330-1 through 330-M. As noted above, the digital filter array may be implemented, for example, as an FIR filter.

For a discussion of suitable techniques for implementing the z-transform operations, see, for example, Wikipedia, "Z-Transform," (March 2017), submitted herewith.

For the exemplary time series encryptor 300, embodied as an FIR filter of order M, each value of the output sequence is a weighted sum of the most recent input values:

$$y[n] = \sum_{k=0}^{M} b_k x[n-k],$$

where x(n) is the input time series signal samples, y(n) is the encrypted output signal (e.g., encrypted time series samples), M is the filter order; and b is a coefficient and the value of the impulse response at the $i^{th}$ time instant for $0 \leq i \leq M$ of an $M^{th}$ order filter.

The exemplary time series encryptor 300 can be considered as a multiplier accumulator (MAC) that takes each sample in the delay line multiplies each by their respective b-value, adds all weighted values together, and provides an output sum.

In one or more embodiments, the size of the input time series data, x(n), (e.g., 1000 samples) should be significantly larger than the size M of the FIR filter (e.g., 256 bytes). If the encryption key is 256 bytes and there are 256 filter taps each having a size of one byte, for example, then each tap will comprise one byte of the enryption key. In another variation, the encryption key is 256 bytes and there are 128 filter taps each having a size of two bytes, then each tap will comprise two bytes of the encryption key.

Figure 4:
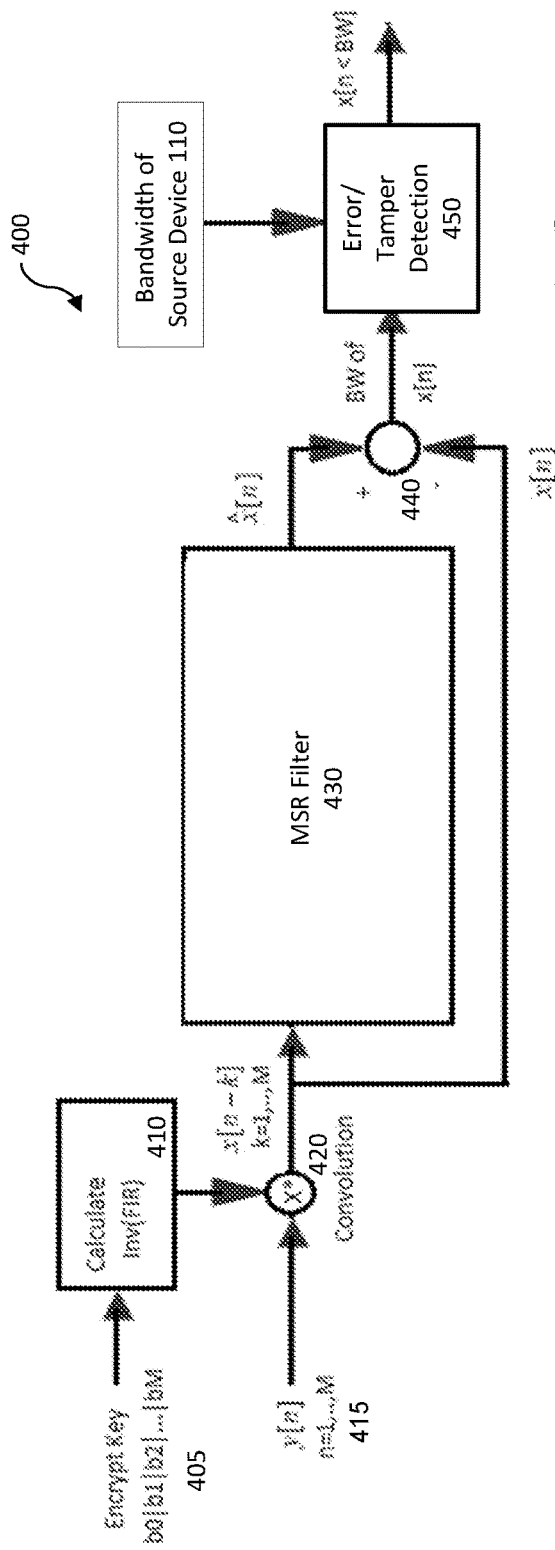
FIG. 4 illustrates an exemplary implementation of the time series decryptor of FIG. 1, according to one embodiment of the disclosure.

FIG. 4 illustrates an exemplary implementation of the time series decryptor 400 of FIG. 1, according to one embodiment of the disclosure. As previously indicated, in one or more embodiments, a digital filter array is used to encrypt time series data and an inverse digital filter array is used to reconstruct the time series data.

As shown in FIG. 4, in one or more embodiments, the exemplary time series decryptor 400 receives the encryption key 405 ($b_0|b_1|b_2| \ldots |b_M|$) from a given source device 110 during a registration process 200 (FIG. 2). Given the encryption key 405, the exemplary time series decryptor 400 can calculate the inverse digital filter array, such as an inverse FIR filter 410. The inverse FIR filter 410 may be generated, for example, using the techniques described in Frank M. Candocia and *Angelica* M. Diaz, "A Time-Domain Approach to Determining Inverse FIR Filters," Proc. of the 2006 Int'l Conf. on Image Processing, Computer Vision, & Pattern Recognition, Las Vegas, Nev., USA, Volume 1 (Jun. 26, 2006), incorporated by reference herein in its entirety. The inverse FIR filter 410 can be calculated using the encryption key, or loaded from a database using information previously calculated, for example, during the registration process 200 (FIG. 2).

The encrypted time series samples, y(n), 415 are received from a given source device 110 with the device identifier. For example, a given source device 110 can send the device identifier once per connection session. The encrypted time series samples, y(n), 415 are applied to a convolution function 420 with the inverse FIR filter 410, to generate the decrypted time series samples, x(n−k), where $1 \leq k \leq M$. The output, x(n−k), of the convolution 420 is a substantially best approximation of the original time series samples of M points (the length of the encryption key).

In one or more embodiments, the decrypted time series samples, x(n−k), are applied to an MSR (Maximum Slew Rate) filter 430. The MSR filter 430 may be implemented, for example, using the techniques described in S. Faibish and I. Moscovitz, "A New Closed-Loop Non-Linear Filter Design", Proc. of the 1st European Control Conf., Grenoble, France (July 1991) incorporated by reference herein in its entirety.

Generally, the exemplary MSR filter 430 employs two device-specific characteristics $K_1$ and $K_2$, tuned to the device bandwidth and/or amplitude. The exemplary MSR filter 430 only allows the second derivative of the input signal to pass through the filter and cuts out portions of the signal beyond the design range. In this manner, the second derivative can be evaluated.

The output, $\hat{x}(n)$, of the exemplary MSR filter 430 has a bandwidth that is compared to the decrypted time series samples, x(n−k), using subtractor 440 to obtain the bandwidth of the decrypted time series samples, x(n−k). The bandwidth of the decrypted time series samples, x(n), is compared to the bandwidth of the source device 110 (for example, based on the device type of the source device 110) by an error/tampering detection stage 450 to detect and optionally correct errors and other anomalies with the decrypted samples, based on predefined detection thresholds. In one or more embodiments, individual samples exceeding the predefined detection threshold are discarded.

One or more embodiments of the disclosure recognize that if there is any tampering with the time series signal, the injected error will have white noise characteristics and will be filtered from the scrambled time series before restoring the data using the FIR filter of the colored time series signal. Moreover, after the time series is decoded and filtered by the decryptor 400, the time series data server 160 can use the additional MSR digital filter 430 to remove erroneous data points based on knowledge of the device type. In this manner, significant changes in first and second derivative of the time series data can be prevented.

EXAMPLES

One popular IoT system is used to monitor the health of a vehicle to detect, for example, the location of a vehicle, operating conditions and engine issues. The amount of data is very rich and include location data of the vehicle. It was demonstrated by students at Washington University that a malicious user could take over the car and create a collision. One or more embodiments of the disclosure can be employed with a specific identifier for each car to scramble the sensor data collected from the car using the disclosed encryption techniques, without exposing the encryption key used for scrambling. The server can use the inverse impulse response to send navigation commands to the car and to decrypt the location of the car.

Another promising IoT system is to monitor the health of hospital patients, for example, with deadly heart failure conditions. Currently, there are offline monitoring devices that can only be read when a patient goes to the clinic. With current monitoring devices, such as Fitbit™ monitoring devices or Apple Watch™ monitoring devices, the heart conditions of a user can be monitored remotely. There is a danger, however, that the time signal is in the clear and can allow hackers to obtain private health information and/or change the information, potentially creating false alerts to medical care professionals. The disclosed encryption techniques can be employed to secure the private health information and prevent a malicious user from falsifying the data.

Terms such as "time series encryption" and "time series decryption" are intended to be broadly construed so as to encompass a wide variety of arrangements in which time series samples are encrypted using a digital filter array and/or decrypted using an inverse digital filter array, respectively.

The particular processing operations and other system functionality described in conjunction with FIGS. 2 through 4 are presented by way of illustrative example only, and should not be construed as limiting the scope of the disclosure in any way. Alternative embodiments can use other types of processing operations involving encryption of time series data, decryption of time series data and evaluation of time series data for errors and falsified time series samples. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of time series encryption (and/or decryption) instances within a given information processing system.

Functionality such as that described in conjunction with FIGS. 2 through 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be understood that the particular information processing system arrangements illustrated in FIGS. 1 through 4 are presented by way of illustrative example only, and should not be construed as limiting in any way. Numerous alternative configurations of system and device elements and associated processing operations can be used in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements.

For example, one or more embodiments provide significantly improved encryption and/or decryption of time series data. As a result, potentially private time series samples are protected and can be made more robust to errors and falsification.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as time series data server 160, or portions thereof, are illustratively implemented for use by tenants of such a multi-tenant environment.

As mentioned previously, cloud infrastructure as disclosed herein can include cloud-based systems such as AWS™, GCP™ and Microsoft Azure®. Virtual machines provided in such systems can be used to implement at least portions of one or more of a compute services platform, a development platform and an automated code testing system in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
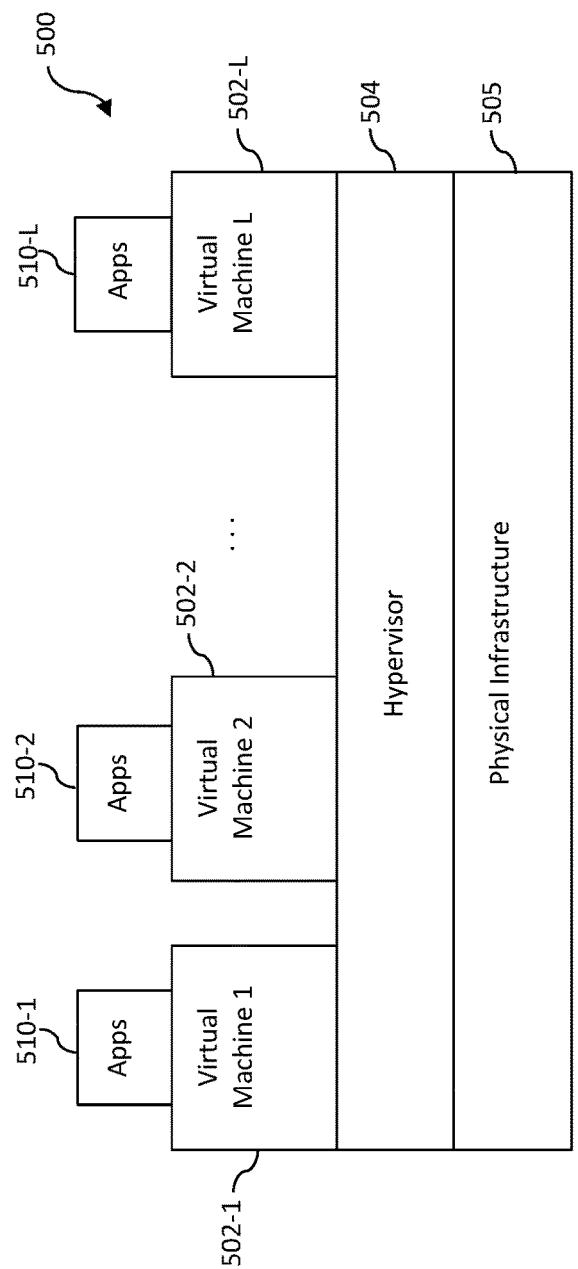
FIGS. 5 and 6 show examples of processing platforms that may be utilized to implement at least a portion of an information processing system in illustrative embodiments of the present disclosure.
Figure 6:
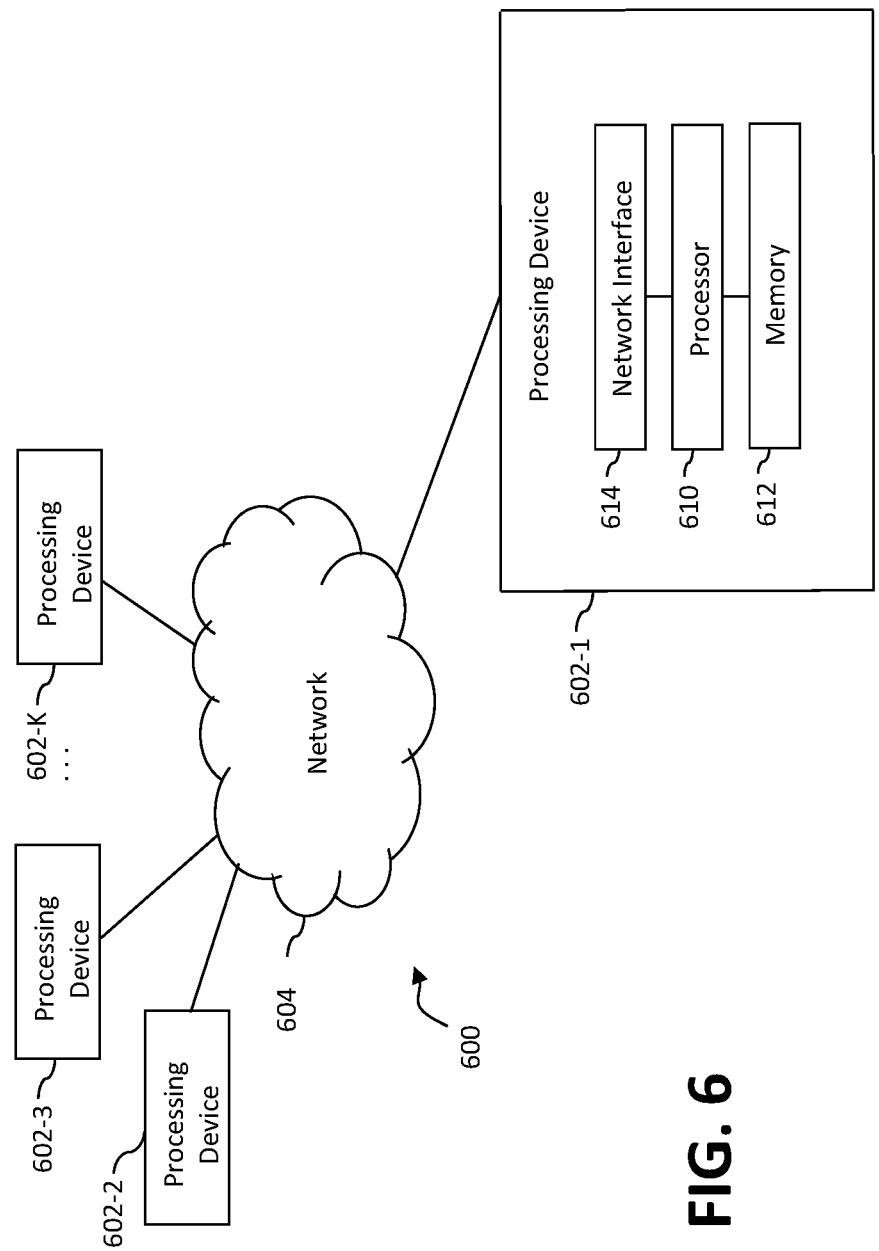

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of time series generation devices 110 and time series data server 160 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, time series generation devices and time series data servers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising the following steps:
obtaining a plurality of digital time series samples generated by a digital time series generation device;
applying, by at least one processing device of said digital time series generation device, said plurality of digital time series samples to a digital filter array that combines delayed versions of said digital time series samples using a plurality of coefficients to generate a plurality of encrypted digital time series samples, wherein said plurality of coefficients each comprise a portion of an encryption key associated with said digital time series generation device, wherein said digital time series generation device comprises a device identifier, and wherein said device identifier and said encryption key associated with said digital time series generation device are provided to a server prior to said applying; and
providing said plurality of encrypted digital time series samples and said device identifier to said server for decryption using an inverse digital filter array.

2. The method of claim 1, wherein said digital filter array comprises one or more of a finite impulse response filter and an infinite impulse response filter.

3. The method of claim 1, wherein each of said plurality of digital time series samples corresponds to a sensor reading.

4. The method of claim 1, wherein said device identifier is provided to said server once per session.

5. The method of claim 1, wherein said encryption key associated with said digital time series generation device is generated using a pseudo random number generator.

6. The method of claim 1, further comprising the step of said server generating said inverse digital filter array for said decryption based on said encryption key.

7. The method of claim 6, further comprising the step of said server detecting whether said plurality of digital time series samples comprises one or more of erroneous digital time series samples and falsified digital time series samples.

8. The method of claim 7, wherein said step of detecting whether said plurality of digital time series samples comprises one or more of erroneous digital time series samples and falsified digital time series samples processes a second derivative of a decrypted version of said encrypted plurality of digital time series samples.

9. The method of claim 7, wherein said step of detecting whether said plurality of digital time series samples comprises one or more of erroneous digital time series samples and falsified digital time series samples processes one or more predefined characteristics of said digital time series generation device.

10. The method of claim 1, further comprising the step of registering said encryption key and said device identifier of said digital time series generation device with said server.

11. An apparatus, comprising:
a memory; and
at least one processing device of a digital time series generation device, coupled to the memory, operative to implement the following steps:
obtaining a plurality of digital time series samples generated by said digital time series generation device;
applying, by the at least one processing device of said digital time series generation device, said plurality of digital time series samples to a digital filter array that combines delayed versions of said digital time series samples using a plurality of coefficients to generate a plurality of encrypted digital time series samples, wherein said plurality of coefficients each comprise a portion of an encryption key associated with said digital time series generation device, wherein said digital time series generation device comprises a device identifier, and wherein said device identifier and said encryption key associated with said digital time series generation device are provided to a server prior to said applying; and
providing said plurality of encrypted digital time series samples and said device identifier to said server for decryption using an inverse digital filter array.

12. The apparatus of claim 11, wherein said digital filter array comprises one or more of a finite impulse response filter and an infinite impulse response filter.

13. The apparatus of claim 11, wherein said encryption key associated with said digital time series generation device is generated using a pseudo random number generator.

14. The apparatus of claim 11, further comprising the steps of said server generating said inverse digital filter array for said decryption based on said encryption key and said server detecting whether said plurality of digital time series samples comprises one or more of erroneous digital time series samples and falsified digital time series samples.

15. The apparatus of claim 14, wherein said step of detecting whether said plurality of digital time series samples comprises one or more of erroneous digital time series samples and falsified digital time series samples processes one or more of a second derivative of a decrypted version of said encrypted plurality of digital time series samples and one or more predefined characteristics of said digital time series generation device.

16. The apparatus of claim 11, further comprising the step of registering said encryption key and said device identifier of said digital time series generation device with said server.

17. A computer program product, comprising a non-transitory processor-readable storage medium having stored therein program code of one or more software programs, wherein the program code when executed by at least one processing platform causes said at least one processing platform to implement the following steps:
obtaining a plurality of digital time series samples generated by a digital time series generation device;
applying, by at least one processing device of said digital time series generation device, said plurality of digital time series samples to a digital filter array that combines delayed versions of said digital time series samples using a plurality of coefficients to generate a plurality of encrypted digital time series samples, wherein said plurality of coefficients each comprise a portion of an encryption key associated with said digital time series generation device, wherein said digital time series generation device comprises a device identifier, and wherein said device identifier and said encryption key associated with said digital time series generation device are provided to a server prior to said applying; and
providing said plurality of encrypted digital time series samples and said device identifier to said server for decryption using an inverse digital filter array.

18. The computer program product of claim 17, wherein said digital filter array comprises one or more of a finite impulse response filter and an infinite impulse response filter.

19. The computer program product of claim 17, wherein said encryption key associated with said digital time series generation device is generated using a pseudo random number generator.

20. The computer program product of claim 17, further comprising the steps of said server generating said inverse digital filter array for said decryption based on said encryption key and said server detecting whether said plurality of digital time series samples comprises one or more of erroneous digital time series samples and falsified digital time series samples.

* * * * *